US010403315B2

(12) United States Patent
Matsumoto et al.

(10) Patent No.: US 10,403,315 B2
(45) Date of Patent: Sep. 3, 2019

(54) NEAR-FIELD TRANSDUCER FOR HEAT ASSISTED MAGNETIC RECORDING COMPRISING OF THERMALLY STABLE MATERIAL LAYER

(71) Applicant: HGST Netherlands B.V., Amsterdam (NL)

(72) Inventors: Takuya Matsumoto, Sunnyvale, CA (US); Vijay Prakash Singh Rawat, San Jose, CA (US); Barry C. Stipe, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 200 days.

(21) Appl. No.: 14/705,684

(22) Filed: May 6, 2015

(65) Prior Publication Data
US 2016/0329068 A1 Nov. 10, 2016

(51) Int. Cl.
G11B 5/012 (2006.01)
G11B 5/60 (2006.01)
G11B 5/31 (2006.01)
G11B 5/00 (2006.01)

(52) U.S. Cl.
CPC ............ *G11B 5/6088* (2013.01); *G11B 5/314* (2013.01); *G11B 5/3106* (2013.01); *G11B 5/3133* (2013.01); *G11B 2005/0021* (2013.01)

(58) Field of Classification Search
None
See application file for complete search history.

(56) References Cited

U.S. PATENT DOCUMENTS

| 8,000,178 | B2 | 8/2011 | Shimazawa et al. |
| 8,351,151 | B2 | 1/2013 | Katine et al. |
| 8,427,925 | B2 | 4/2013 | Zhao et al. |
| 8,514,673 | B1 | 8/2013 | Zhao et al. |
| 8,705,327 | B2 | 4/2014 | Matsumoto |
| 8,830,799 | B1 | 9/2014 | Sasaki et al. |
| 8,830,800 | B1 | 9/2014 | Pitcher et al. |
| 8,867,170 | B1 | 10/2014 | Sasaki et al. |

(Continued)

FOREIGN PATENT DOCUMENTS

| CN | 103514888 A | 1/2014 |
| CN | 103514889 A | 1/2014 |
| WO | 2013/163195 A1 | 10/2013 |

OTHER PUBLICATIONS

Matsumoto, et al.; Integrated Head Design Using a Nanobeak Antenna for Thermally Assisted Magnetic Recording dated Jun. 6, 2012; 9 total pages.

(Continued)

*Primary Examiner* — Brian M Butcher
(74) *Attorney, Agent, or Firm* — Patterson & Sheridan, LLP; Steven Versteeg

(57) ABSTRACT

Embodiments disclosed herein generally relate to a HAMR head. The HAMR head includes a main pole, a waveguide and a NFT disposed between the main pole and the waveguide. The NFT includes an antenna, and the antenna includes a first portion and a second portion. The second portion may be made of a material having a higher melting point than the material of the first portion. Having the second portion helps reduce the temperature rise of the NFT and reduce the laser power applied to the NFT.

22 Claims, 10 Drawing Sheets

(56) References Cited

U.S. PATENT DOCUMENTS

| | | | |
|---|---|---|---|
| 8,988,975 B1 | 3/2015 | Sasaki et al. | |
| 9,208,806 B2 * | 12/2015 | Sasaki | G11B 5/4866 |
| 2013/0279315 A1 | 10/2013 | Zhao et al. | |
| 2013/0286799 A1 | 10/2013 | Zhu et al. | |
| 2014/0043948 A1 | 2/2014 | Hirata et al. | |
| 2014/0376342 A1 * | 12/2014 | Wessel | G02B 6/1226 |
| | | | 369/13.33 |
| 2015/0131417 A1 * | 5/2015 | Zhao | G11B 5/6082 |
| | | | 369/13.33 |

OTHER PUBLICATIONS

Zhou, et al.; De Gruyter; Plasmonic Near-Field Transducer for Heat-Assisted Magnetic Recording dated Jan. 20, 2014; 15 total pages.

Bhargava, et al.; SPIE; Multi-Objective Inverse Design of Sub-Wavelength Optical Focusing Structures for Heat Assisted Magnetic Recording dated Sep. 5, 2014; 1 page.

Office Action issued in corresponding Chinese Patent Application No. 201610529457.0, dated Jun. 25, 2018 (25 pages).

* cited by examiner

NEAR-FIELD TRANSDUCER FOR HEAT ASSISTED MAGNETIC RECORDING COMPRISING OF THERMALLY STABLE MATERIAL LAYER

BACKGROUND

Field

Embodiments disclosed herein generally relate to a magnetic disk device employing a heat assisted magnetic recording (HAMR) head.

Description of the Related Art

In a magnetic disk device that employs a HAMR head, a near-field transducer (NFT) may be utilized to locally heat magnetic media having high coercivity during recording to lower the coercivity of the localized region. Gold is typically used for the NFT material to achieve a high optical efficiency, but the melting point of gold is low and deformation of the NFT is a problem when the NFT is heated for a long term. The NFT temperature is especially high near the point where the optical near-field is generated, and the maximum temperature may reach more than 150 degrees C. over the operational temperature of the magnetic disk device. When the NFT temperature is more than 150 degrees C. over the operational temperature of the magnetic disk device, atomic diffusion of gold atoms via surface, grain boundary, or lattice increases significantly, causing the NFT to deform.

One solution is to use an alloy for the NFT material, which is more stable at elevated temperatures. However, the use of the alloy increases the NFT temperature during operation for two reasons: 1) the imaginary part of the dielectric constant is large, and more light is absorbed by the NFT, and 2) the thermal conductivity of the NFT is lowered due to phonon scattering by dopant atoms, and the heat flow inside the NFT is reduced. If the NFT temperature rise is too high, the benefit of using the alloy may be cancelled out.

Therefore, there is a need in the art for an improved HAMR head.

SUMMARY

Embodiments disclosed herein generally relate to a HAMR head. The HAMR head includes a main pole, a waveguide and a NFT disposed between the main pole and the waveguide. The NFT includes an antenna, and the antenna includes a first portion and a second portion. The second portion may be made of a material having a higher melting point than the material of the first portion. Having the second portion helps reduce the temperature rise of the NFT and reduce the laser power applied to the NFT.

In one embodiment, a HAMR head includes a main pole, a waveguide, and a NFT disposed between the main pole and the waveguide. The NFT includes an antenna, and the antenna includes a first portion made of a first material and a second portion made of a second material. The second portion of the antenna is a layer embedded in the first portion. The HAMR head further includes a thermal shunt coupled to the antenna.

In another embodiment, a HAMR head includes a main pole, a waveguide, a heat sink, and a NFT disposed between the main pole and the waveguide. The NFT includes an antenna and the antenna includes a first portion made of a first material and a second portion made of a second material. The second material has a higher melting point than the first material. The antenna additionally includes a first surface at a media facing surface, and the second portion includes at least a portion of the first surface. The HAMR head further includes a thermal shunt disposed between the antenna and the heat sink.

In another embodiment, a heat assisted magnetic recording head includes a main pole, a waveguide, a NFT disposed between the main pole and the waveguide. The NFT includes an antenna. The HAMR head further includes a thermal shunt coupled to the antenna and a layer disposed between the thermal shunt and the antenna.

In another embodiment, a hard disk drive includes a magnetic media, a magnetic read head, and a HAMR write head. The HAMR write head includes a main pole, a waveguide, a heat sink, and a NFT disposed between the main pole and the waveguide. The NFT includes an antenna and the antenna includes a first portion made of a first material and a second portion made of a second material. The second material has a higher melting point than the first material. The antenna additionally includes a first surface at a media facing surface, and the second portion includes at least a portion of the first surface. The HAMR write head further includes a thermal shunt disposed between the antenna and the heat sink.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the claimed subject matter. Furthermore, although embodiments described herein may achieve advantages over other possible solutions and/or over the prior art, whether or not a particular advantage is achieved by a given embodiment is not limiting of the claimed subject matter. Thus, the following aspects, features, embodiments and advantages are merely illustrative and are not considered elements or limitations of the appended claims except where explicitly recited in a claim(s).

Embodiments disclosed herein generally relate to a HAMR head. The HAMR head includes a main pole, a waveguide and a NFT disposed between the main pole and the waveguide. The NFT includes an antenna, and the antenna includes a first portion and a second portion. The second portion may be made of a material having a higher melting point than the material of the first portion. Having the second portion helps reduce the temperature rise of the NFT and reduce the laser power applied to the NFT.

Figure 1A:
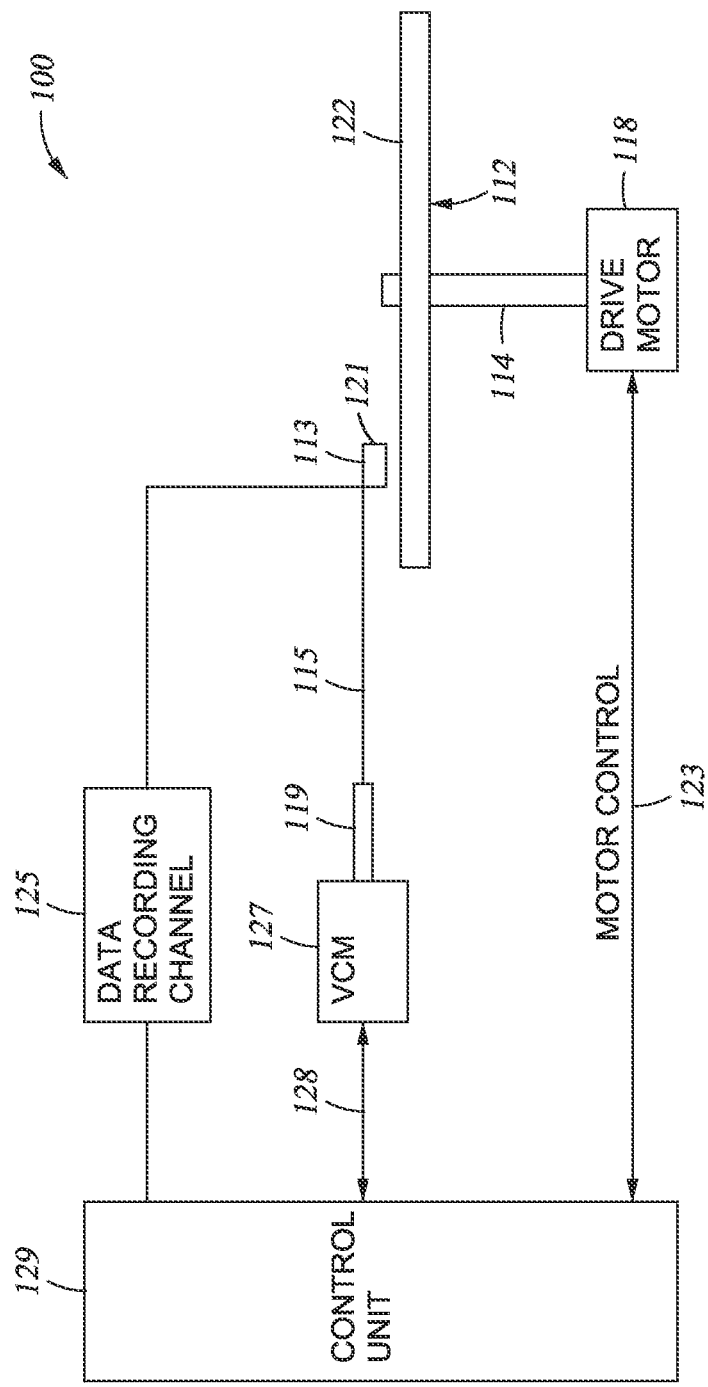
FIGS. 1A and 1B illustrate a disk drive system according to embodiments described herein.

FIG. 1A illustrates a disk drive 100 embodying this disclosure. As shown, at least one rotatable magnetic media 112 is supported on a spindle 114 and rotated by a disk drive motor 118. The magnetic recording on each media is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121 that may include a radiation source (e.g., a laser or LED) for heating the media surface 122. As the magnetic media 112 rotates, the slider 113 moves radially in and out over the media surface 122 so that the magnetic head assembly 121 may access different tracks of the magnetic media 112 to read or record data. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1A may be a voice coil motor (VCM). The VCM includes a coil movable within a fixed magnetic field, the direction and speed of the coil movements being controlled by the motor current signals supplied by control unit 129.

During operation of a HAMR enabled disk drive 100, the rotation of the magnetic media 112 generates an air bearing between the slider 113 and the media surface 122 which exerts an upward force or lift on the slider 113. The air bearing thus counter-balances the slight spring force of suspension 115 and supports slider 113 slightly above the media 112 surface by a small, substantially constant spacing during normal operation. The radiation source heats up the high-coercivity media so that the write elements of the magnetic head assembly 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of media and actuators, and each actuator may support a number of sliders.

Figure 1B:
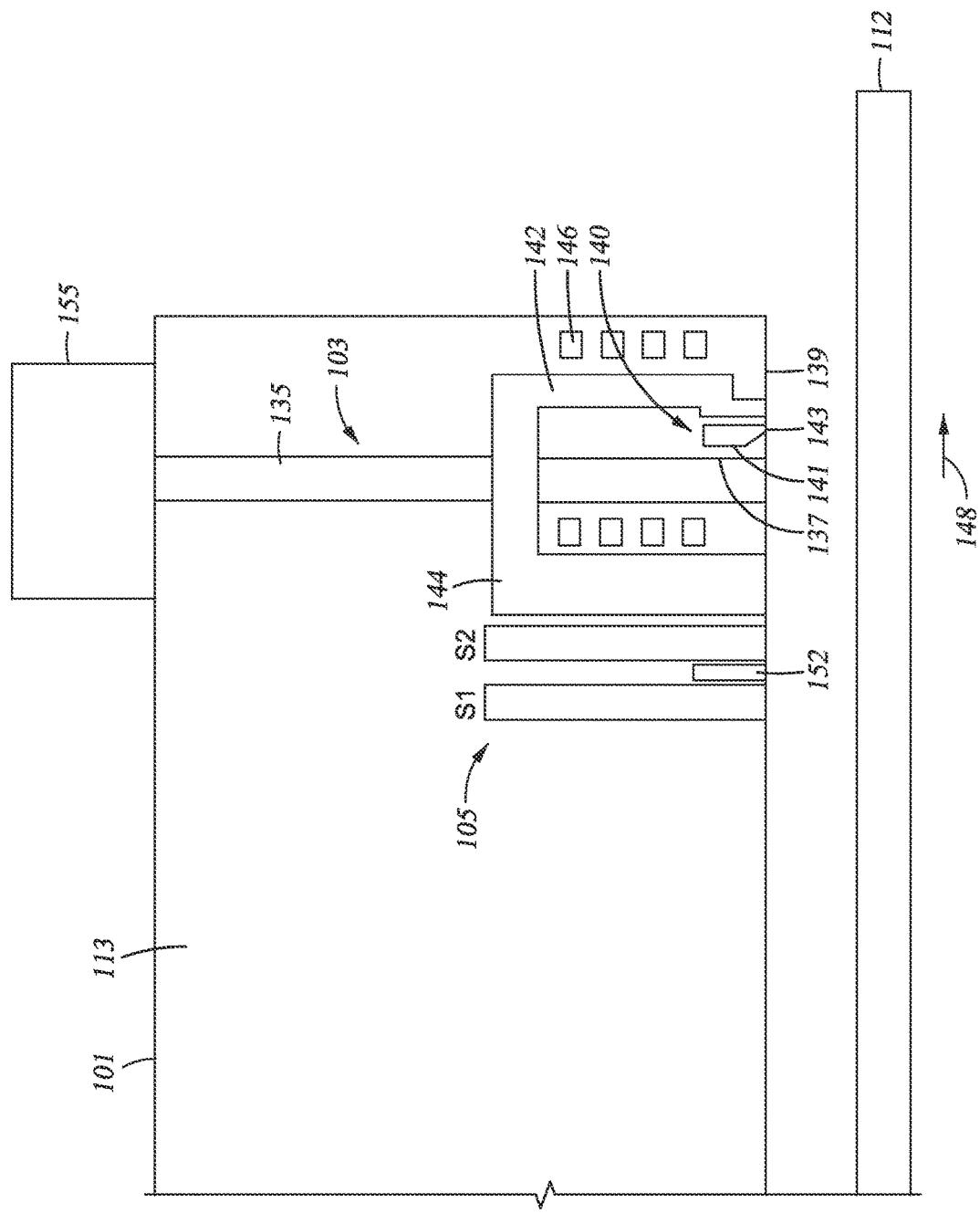

FIG. 1B is a fragmented, cross sectional side view of a HAMR read/write head 101 and magnetic media 112 of the disk drive 100 of FIG. 1A. The read/write head 101 may correspond to the magnetic head assembly 121 described in FIG. 1A. The read/write head 101 includes a media facing surface (MFS) 139, such as an air bearing surface (ABS), a write head 103 and a magnetic read head 105, and is mounted on the slider 113 such that the MFS 139 is facing the magnetic media 112. As shown in FIG. 1B, the magnetic media 112 moves past the write head 103 in the direction indicated by the arrow 148. As shown in FIG. 1B and subsequent figures, the X direction denotes an along-the-track direction, the Y direction denotes a track width or cross-track direction, and the Z direction denotes a direction substantially perpendicular to the MFS 139.

In some embodiments, the magnetic read head 105 is a magnetoresistive (MR) read head that includes an MR sensing element 152 located between MR shields S1 and S2. In other embodiments, the magnetic read head 105 is a magnetic tunnel junction (MTJ) read head that includes a MTJ sensing element 152 located between MR shields S1 and S2. The magnetic fields of the adjacent magnetized regions in the magnetic media 112 are detectable by the MR (or MTJ) sensing element 152 as the recorded bits.

The write head 103 includes a main pole 142, a waveguide 135, a NFT 140 disposed between the main pole 142 and the waveguide 135, a return pole 144, and a coil 146 that excites the main pole 142. A spot size converter (not shown) may be coupled to the NFT 140 and may be substantially parallel to the waveguide 135. The write head 103 may be operatively attached to a laser 155 (i.e., a radiation source). The laser 155 may be placed directly on the write head 103 or radiation may be delivered from the laser 155 located separate from the slider 113 through an optical fiber or waveguide. The waveguide 135 is a channel that transmits the radiation through the height of the write head 103 to the NFT 140—e.g., a plasmonic device or optical transducer—which is located at or near the MFS 139. When radiation, such as a laser beam, is introduced into the waveguide 135, an evanescent wave is generated at a surface 137 of the waveguide 135 that couples to a surface plasmon excited on a surface 141 of the NFT 140. The surface plasmon propagates to a surface 143 of the NFT 140, and an optical near-field spot is generated near an apex (not shown) of the surface 143. In other embodiments, the waveguide 135 may not extend to the MFS 139, and the NFT 140 may be disposed at an end of the waveguide 135, so the NFT 140 is aligned with the waveguide 135. The embodiments herein, however, are not limited to any particular type of radiation source or technique for transferring the energy emitted from the radiation source to the MFS 139. The NFT 140 as shown in FIG. 1B is a nanobeak NFT. However, the NFT 140 is not limited to any particular type of NFT. In some embodiments, the NFT 140 is an e-antenna NFT or a lollipop NFT.

Figure 2A:
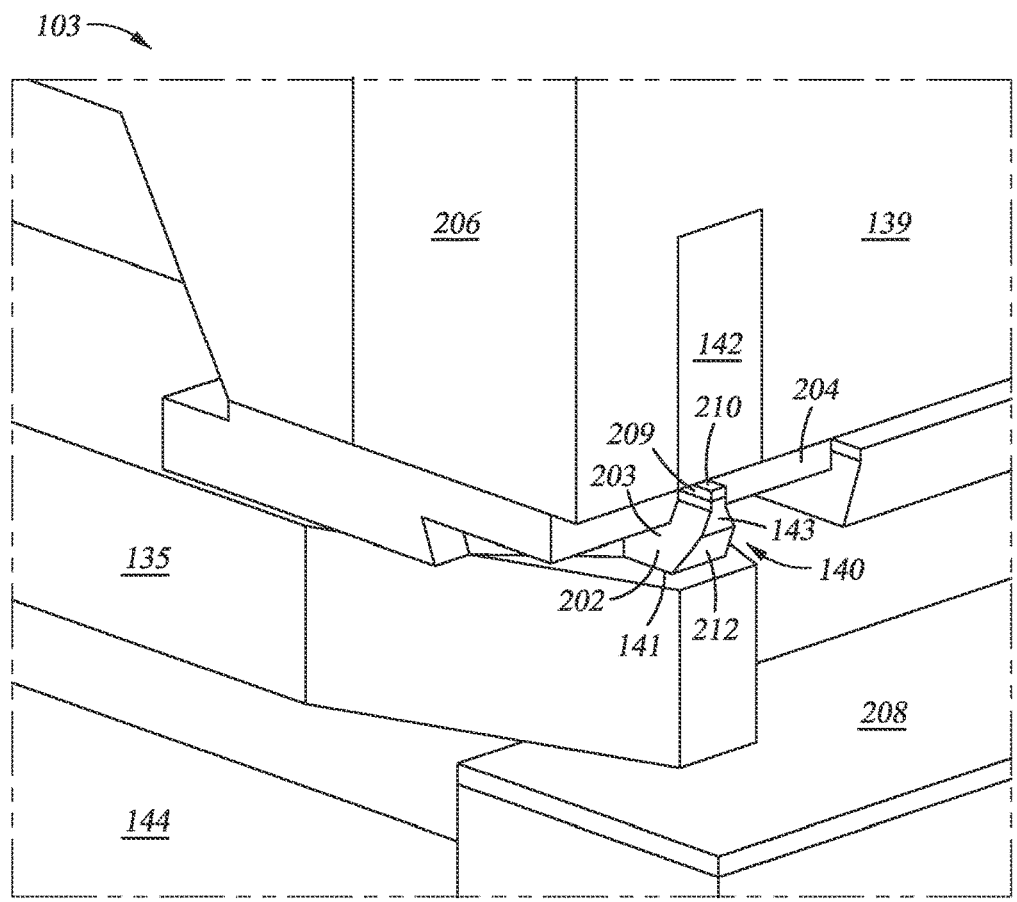
FIGS. 2A and 2B illustrate a HAMR write head according to one embodiment described herein.

FIG. 2A is a fragmented perspective view of the HAMR write head 103, according to one embodiment described herein. To better illustrate certain components of the write head 103, a cladding material and a spacer layer are omitted. The write head 103 includes the return pole 144, the waveguide 135, the NFT 140, and the main pole 142. The NFT 140 may include an antenna 202. The write head 103 may further include a thermal shunt 204 coupled to the antenna 202, and the thermal shunt 204 may be disposed between the antenna 202 and the heat sink 206. The thermal shunt 204 may be made of a conductive material. The write head 103 may further include a heat sink 206 surrounding the main pole 142 and a mirror layer 208 disposed on a surface of the return pole 144. The antenna 202 may include the surface 143 at the MFS 139, the surface 141 facing the waveguide 135, a surface 210 facing the main pole 142, and a surface 212 connecting the surface 143 and the surface 141.

The antenna 202 may also include a first portion 203 and a second portion 209. The second portion 209 may be a layer within the antenna 202 and may include the surface 210. The first portion 203 of the antenna 202 may be made of a metal, such as gold (Au), silver (Ag), copper (Cu) or aluminum (Al). The second portion 209 may be made of a material having a melting point that is greater than the melting point of the metal of the first portion 203, and the material of the second portion 209 may be immiscible in the material of the first portion 203. The second portion 209 may be made of an element or an alloy. In one embodiment, the second portion 209 is made of an element, such as Rh, Co, Ni, Pt, Pd, Ru, B, Mo, W, Ti, Ir, or Re. In other embodiments, the second portion 209 is made of an alloy. The alloy of the second portion 209 may include one or more metals, such as Rh, Co, Ni, Pt, Pd, Ru, B, Mo, W, Ti, Ir, Re, Au, Ag, Cu, or Al. In some embodiments, the alloy of the second portion 209 may include one or more metals and one or more alloying elements. The one or more metals of the alloy may be the same as the metal used for the first portion 203. Alternatively, the one or more metals of the alloy may include multiple metals. The one or more alloying elements may be any suitable material, such as Rh, Co, Ni, Pt, Pd, Ru, B, Mo, W, Ti, Ir, or Re. In some embodiments, the alloy is a gold alloy, such as AuRh, AuCo, or AuNi. In some embodiments, a ternary alloy is used to form the second portion 209, and the ternary alloy includes a metal alloyed with two alloying elements, or two metals with one alloying element, such as AgPdCu. In some embodiments, multiple metals are mixed with one or more alloying elements, such as AuAgCuIr or AuAgCuIrPd.

Figure 2B:
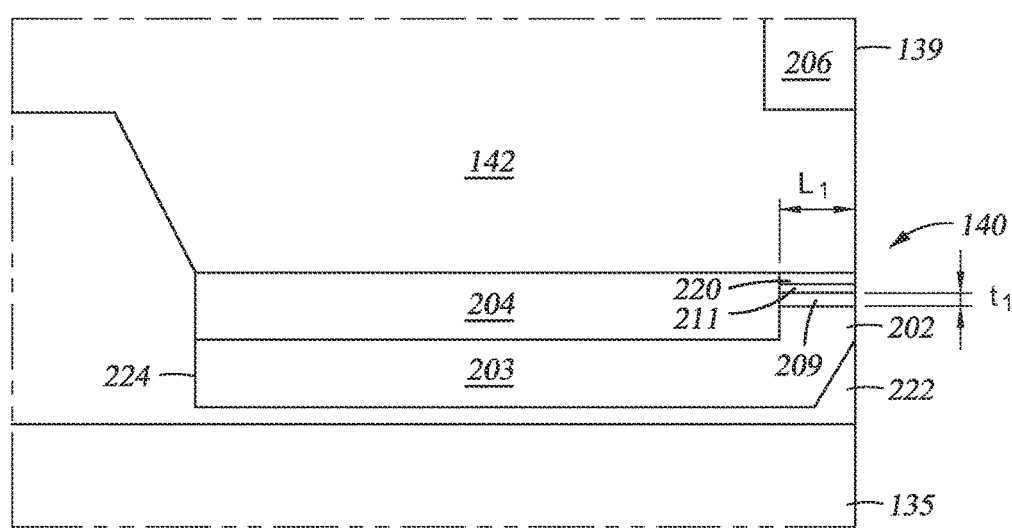

FIG. 2B is a fragmented cross sectional view of the HAMR write head 103, according to one embodiment described herein. The write head 103 may include a cladding material 222 disposed between the waveguide 135 and the antenna 202, and the NFT 140 may include a spacer layer 220 disposed between the antenna 202 and the main pole 142. Both the cladding material 222 and the spacer layer 220 may be made of a dielectric material such as alumina, silicon oxide, silicon nitride, silicon oxynitride, or combinations thereof. The antenna 202 includes the first portion 203 and the second portion 209. An adhesion layer 211 may be disposed between the second portion 209 and the spacer layer 220, and the adhesion layer 211 may be made of any suitable material, such as Ta, Ti, Cr, Ni, Co, Hf, Zr, oxide of the materials mentioned thereof, or nitride of the materials mentioned thereof. The second portion 209 may have a length $L_1$ extending from the MFS 139 to a location away from the MFS 139. The length $L_1$ may be equal to or less than the distance between the thermal shunt 204 and the MFS 139. The length $L_1$ may range from about 30 nm to about 150 nm. When light is introduced into the antenna 202, charges in the antenna 202 are concentrated in the second portion 209 at the MFS 139, and large amount of heat is generated at MFS 139 in the second portion 209. If the second portion 209 extends to a back edge 224 of the antenna 202, heat flow to the heat sink 206 is reduced, and the temperature of the NFT 140 increases. Thus, by reducing the length $L_1$ of the second portion 209, the heat flow to the heat sink 206 is improved and the temperature of the NFT 140 is reduced.

The second portion 209 of the antenna 202 may have a thickness $t_1$ ranging from about 3 angstroms to about 50 nm. In one embodiment, the second portion 209 is made of an element, such as Rh, Co, Ni, Pt, Pd, Ru, B, Mo, W, Ti, Ir or Re, and the thickness $t_1$ of the second portion 209 is less than about 3 nm, such as from 3 to 5 angstroms. In another embodiment, the second portion 209 is made of an alloy as described above, and the thickness $t_1$ of the second portion 209 is less than 50 nm, such as about 3 to 5 nm.

Figure 3A:
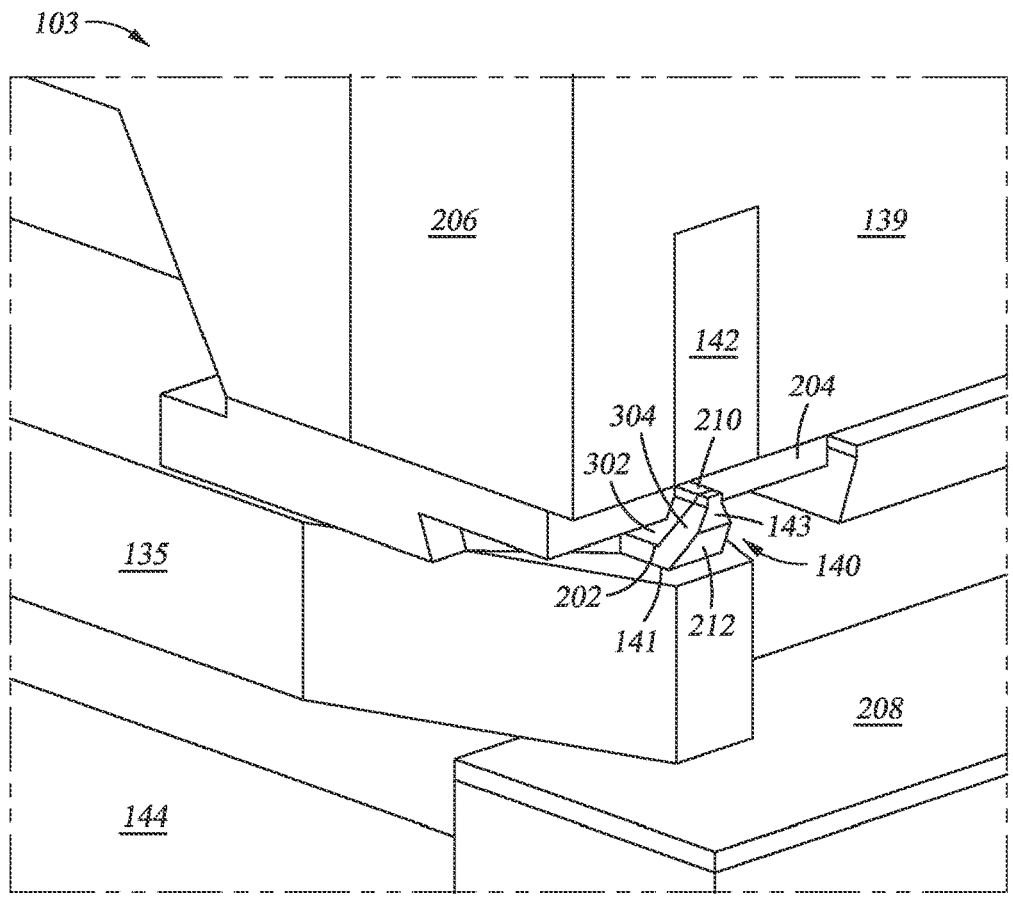
FIGS. 3A and 3B illustrate the HAMR write head according to one embodiment described herein.

FIG. 3A is a fragmented perspective view of the HAMR write head 103, according to one embodiment described herein. Again the cladding material and the spacer layer are omitted. The antenna 202 may include a first portion 302 and a second portion 304. The first portion 302 may be made of the same material as the first portion 203 (FIG. 2A), and the second portion 304 may be made of the same material as the second portion 209 (FIG. 2A). The second portion 304 may be a layer within the antenna 202 and may include a portion of the surface 210, the entire surface 143, the entire surface 212 and a portion of the surface 141.

Figure 3B:
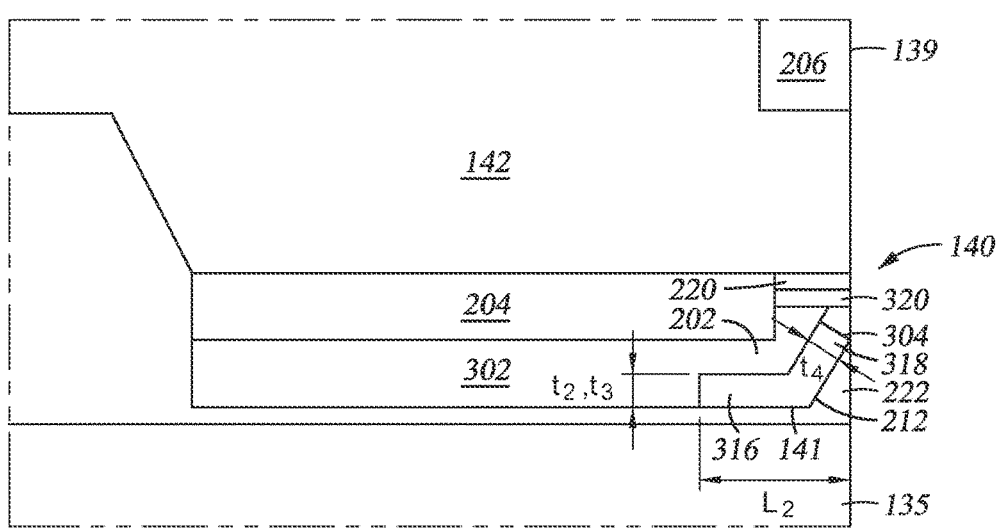

As shown in FIG. 3B, an adhesion layer 320 may be disposed between the antenna 202 and the spacer layer 220, and the adhesion layer 320 may be made of the same material as the adhesion layer 211. The second portion 304 of the antenna 202 may have a substantially uniform thickness $t_2$ that is less than about 100 nm, such as ranging from about 3 angstroms to about 50 nm. In one embodiment, the second portion 304 is made of an element, such as Rh, Co, Ni, Pt, Pd, Ru, B, Mo, W, Ti, Ir or Re, and the thickness $t_2$ of the second portion 304 is less than about 3 nm, such as 3 to 5 angstroms. In another embodiment, the second portion 304 is made of an alloy as described above, and the thickness $t_2$ of the second portion 304 is less than 50 nm. In some embodiments, the second portion 304 may have varying thicknesses. The second portion 304 may include a portion 316 that includes a portion of the surface 141, and the portion 316 of the second portion 304 has a thickness $t_3$. The second portion 304 may include a portion 318 that includes the surface 212, and the portion 318 of the second portion 304 has a thickness $t_4$. The thicknesses $t_3$ and $t_4$ may be different. The second portion 304 may have a length $L_2$ extending from the MFS 139 to a location away from the MFS 139. The length $L_2$ may range from about 50 nm to about 150 nm.

Figure 4A:
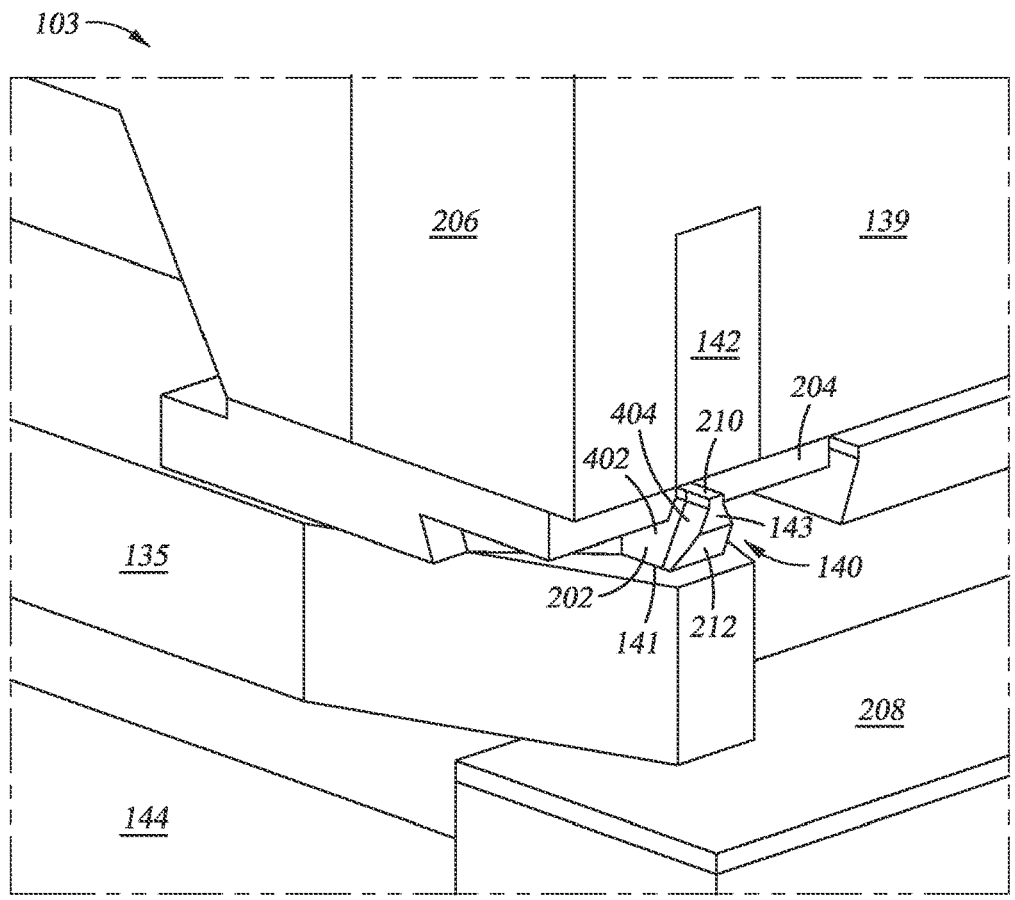
FIGS. 4A and 4B illustrate the HAMR write head according to one embodiment described herein.

FIG. 4A is a fragmented perspective view of the HAMR write head 103 according to one embodiment. The antenna 202 may include a first portion 402 and a second portion 404. The first portion 402 may be made of the same material as the first portion 203 (FIG. 2A), and the second portion 404 may be made of the same material as the second portion 209 (FIG. 2A). The second portion 404 may include a portion of the surface 210, the entire surface 143, the entire surface 212 and a portion of the surface 141.

Figure 4B:
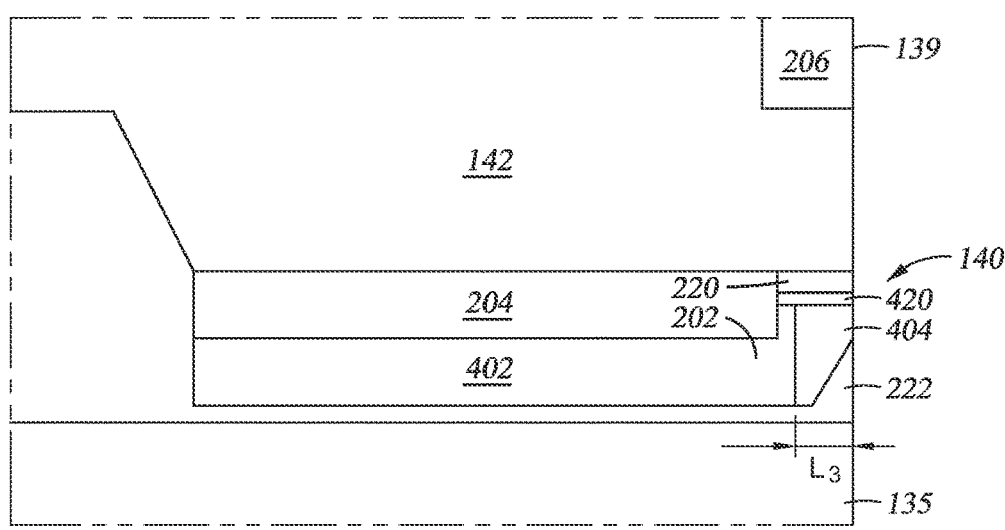

As shown in FIG. 4B, an adhesion layer 420 may be disposed between the antenna 202 and the spacer layer 220, and the adhesion layer 420 may be made of the same material as the adhesion layer 211. The second portion 404 of the antenna 202 may have a length $L_3$ extending from the MFS 139 to a location away from the MFS 139. The length $L_3$ may range from about 50 nm to about 150 nm.

Figure 5A:
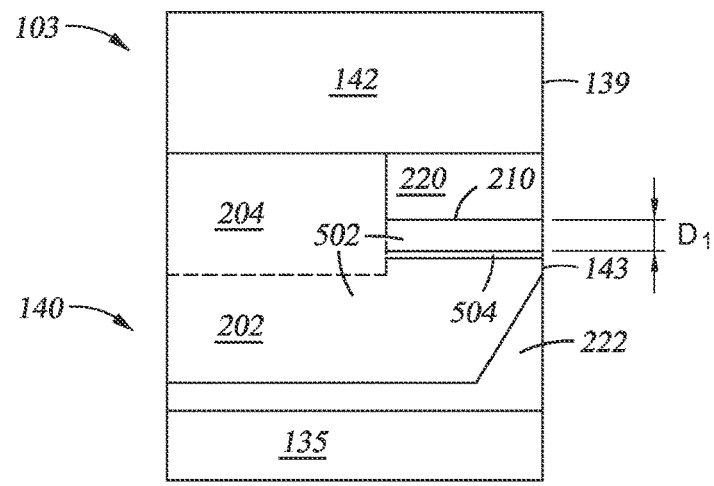
FIGS. 5A-5C are fragmented cross sectional side views of the HAMR write head according to various embodiments.
Figure 5B:
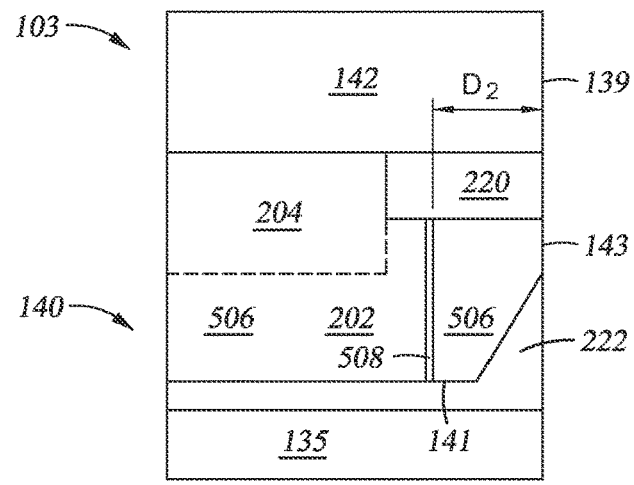
Figure 5C:
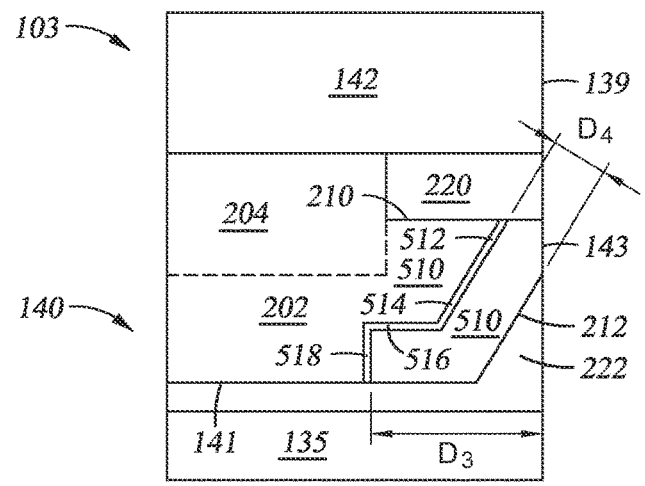

FIGS. 5A-5C are fragmented cross sectional side views of the HAMR write head 103 according to various embodiments. As shown in FIG. 5A, the antenna 202 includes a first portion 502 and a second portion 504. The second portion 504 may be a layer embedded in the first portion 502, and the second portion 504 may include a portion of the surface 143. The first portion 502 may be made of the same material as the first portion 203 (FIG. 2A), and the second portion 504 may be made of the same material as the second portion 209 (FIG. 2A). The second portion 504 may be a layer that is substantially perpendicular to the MFS 139 and may be a distance $D_1$ away from the surface 210. The distance $D_1$ may range from about 10 nm to about 50 nm. The second portion 504 has a thickness ranging from about 0.5 nm to about 30 nm. In one embodiment, the second portion 504 is made of an element, such as Rh, Co, Ni, Pt, Pd, Ru, B, Mo, W, Ti, Ir or Re, and the thickness of the second portion 504 ranges from about 0.5 nm to about 5 nm. In another embodiment, the second portion 504 is made of an alloy that is the same as the alloy used for the second portion 209 (FIG. 2A), and the thickness of the second portion 504 ranges from about 1 nm to about 30 nm. The purpose of having the second portion 504 is to prevent the diffusion of atoms from the area of the antenna 202 having the highest temperature during operation to other areas of the antenna 202. The diffusion of atoms from one area to other areas can cause the antenna 202 to deform.

As shown in FIG. 5B, the antenna 202 includes a first portion 506 and a second portion 508. The second portion 508 may be a layer embedded in the first portion 506, and the second portion 508 may include a portion of the surface 141. The first portion 506 may be made of the same material as the first portion 203 (FIG. 2A), and the second portion 508 may be made of the same material as the second portion 209 (FIG. 2A). At least a portion of the second portion 508 is substantially parallel to the MFS 139. In one embodiment, the entire second portion 508 is substantially parallel to the MFS 139 and is a distance $D_2$ away from the MFS 139. The distance $D_2$ may range from about 60 nm to about 200 nm. The second portion 508 may be disposed at a location adjacent the thermal shunt 204 within the antenna 202. The second portion 508 has a thickness ranging from about 0.5 nm to about 30 nm. In one embodiment, the second portion 508 is made of an element, such as Rh, Co, Ni, Pt, Pd, Ru, B, Mo, W, Ti, Ir or Re, and the thickness of the second portion 508 ranges from about 0.5 nm to about 5 nm. In another embodiment, the second portion 508 is made of an alloy that is the same as the alloy used for the second portion 209 (FIG. 2A), and the thickness of the second portion 508 ranges from about 0.5 nm to about 30 nm.

As shown in FIG. 5C, the antenna 202 includes a first portion 510 and a second portion 512. The second portion 512 may be a layer embedded in the first portion 510, and the second portion 512 may include a portion of the surface 210 and a portion of the surface 141. The first portion 510 may be made of the same material as the first portion 203 (FIG. 2A), and the second portion 512 may be made of the same material as the second portion 209 (FIG. 2A). The second portion 512 may be a layer having a first portion 514 that is substantially parallel to the surface 212, a second portion 516 that is substantially parallel to the surface 141, and a third portion 518 that is substantially parallel to the MFS 139. In some embodiments, the third portion 518 has a curved cross sectional profile extending from the second portion 516 to the surface 141. In some embodiments, the third portion 518 is not present in the antenna 202. The third portion 518 may be a distance $D_3$ away from the MFS 139.

The distance $D_3$ between the third portion 518 of the second portion 512 and the MFS 139 may range from about 60 nm to about 200 nm. The distance $D_4$ between the first portion 514 or second portion 516 and the surface 212 or surface 141, respectively, may be less than about 100 nm, such as about 45 nm. The second portion 512 has a thickness ranging from about 0.5 nm to about 30 nm. In one embodiment, the second portion 512 is made of an element, such as Rh, Co, Ni, Pt, Pd, Ru, B, Mo, W, Ti, Ir or Re, and the thickness of the second portion 512 ranges from about 0.5 nm to about 5 nm. In another embodiment, the second portion 512 is made of an alloy that is the same as the alloy used for the second portion 209 (FIG. 2A), and the thickness of the second portion 512 ranges from about 0.5 nm to about 30 nm. Having the second portion 504, 508, 512 as a layer embedded at various locations in the antenna 202, deformation of the NFT 140 is prevented due to the higher melting point of the second portion 504, 508, 512 than the first portion 502, 506, 510, respectively.

Figure 6A:
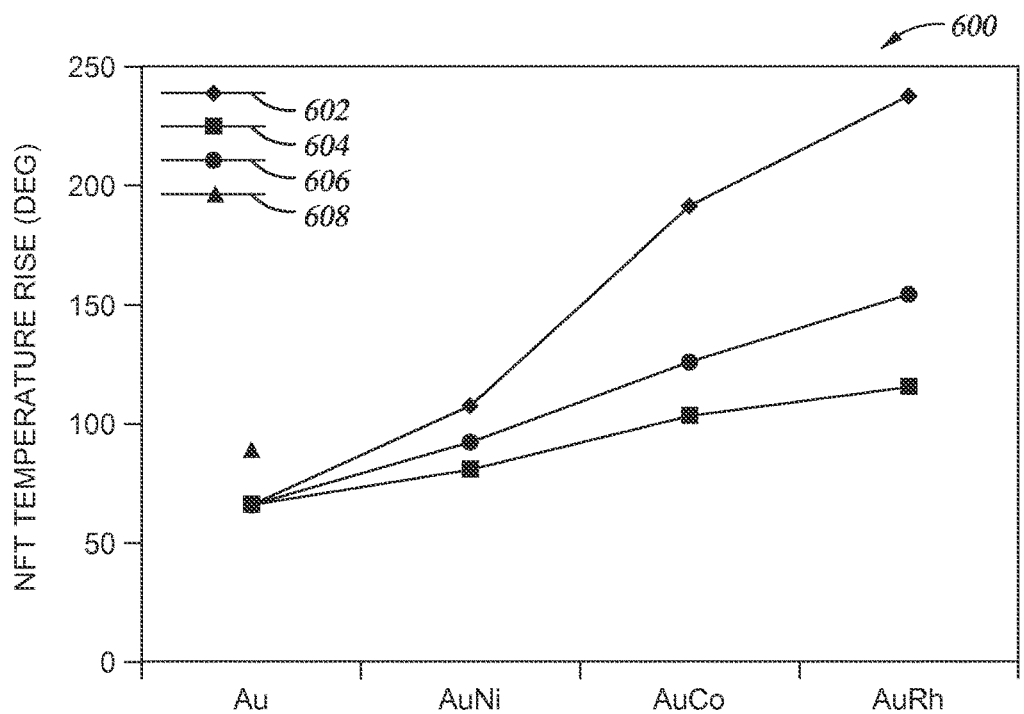
FIGS. 6A-6B are charts showing effects of an antenna having a second portion on the temperature rise of the NFT and the required laser power to power the NFT, according to various embodiments.
Figure 6B:
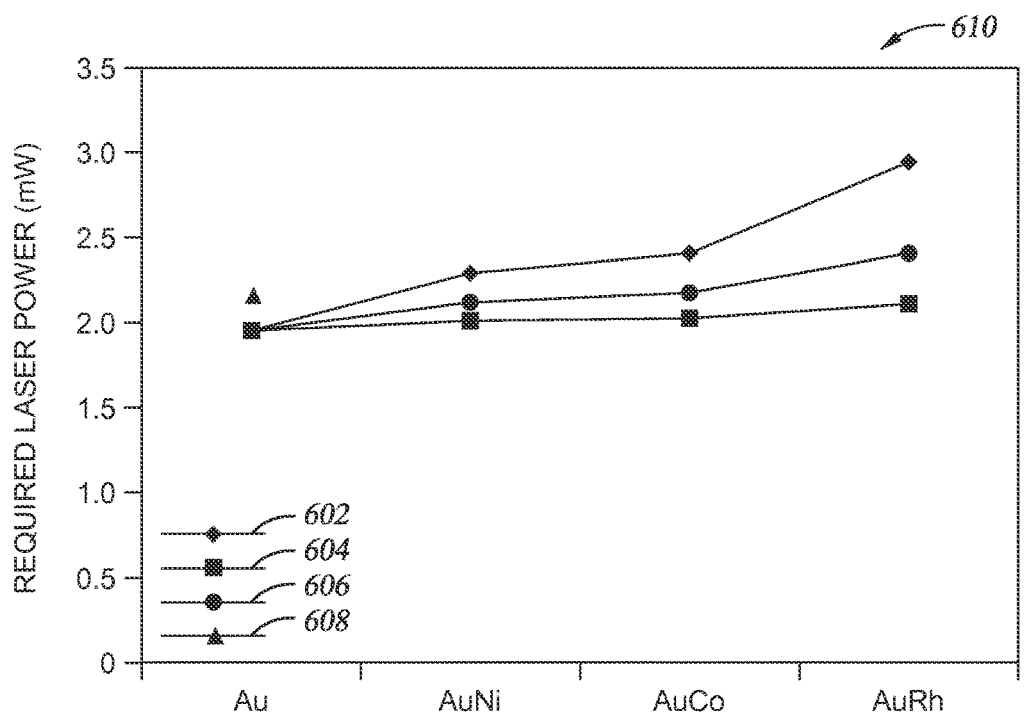

FIGS. 6A-6B are charts showing the effects of having the second portion on the temperature rise of the antenna 202 or the NFT 140 and the required laser power to power the NFT 140. FIG. 6A is a chart 600 showing the relationship between the NFT 140 temperature rise and the materials used for the antenna 202. The materials shown in the x-axis are Au, AuNi (1.4 atomic percent Ni in Au), AuCo (1.7 atomic percent Co in Au), and AuRh (1.8 atomic percent Rh in Au). Profile 602 represents an antenna that does not include a second portion (i.e., the entire antenna 202 is made of Au, AuNi, AuCo, or AuRh). Profile 604 represents the antenna 202 as shown in FIGS. 2A and 2B, of which the first portion 203 is made of Au and the second portion 209 is made of Au, AuNi, AuCo, or AuRh. The thickness $t_1$ of the second portion 209 is about 15 nm and the length $L_1$ is about 55 nm. Profile 606 represents the antenna 202 as shown in FIGS. 3A and 3B, of which the first portion 302 is made of Au and the second portion 304 is made of Au, AuNi, AuCo, or AuRh. The thickness $t_2$ of the second portion 304 is about 45 nm and the length $L_2$ is about 70 nm. Profile 608 represents the antenna 202 as shown in FIG. 5C, of which the first portion 510 is made of Au and the second portion 512 is made of Rh. The second portion 512 has a thickness of about 3 nm and the distance $D_4$ is about 45 nm. As shown in FIG. 6A, the data points representing the entire antenna made of Au (data point at Au x-axis for profiles 602, 604 and 606) show the lowest NFT temperature rise, however, the low melting point of Au causes the NFT 140 to deform during operation. When using an Au alloy for the entire antenna, as represented by the next three data points in profile 602, the NFT temperature rise is higher than the corresponding data points in profiles 604 and 606, and higher than the data point in profile 608. Thus, an antenna having a first portion and a second portion that is made of a material having a higher melting point than the material of the first portion reduces the NFT temperature rise. Similarly, the required laser power is also reduced, as presented by chart 610 in FIG. 6B.

Figure 7A:
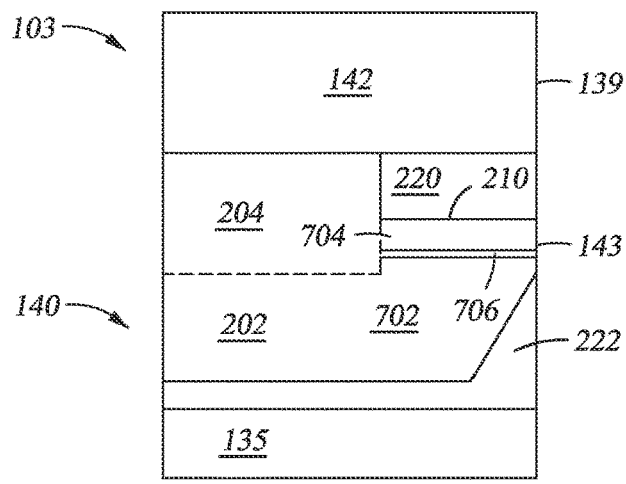
FIGS. 7A-7C are fragmented cross sectional side views of the HAMR write head according to various embodiments.
Figure 7B:
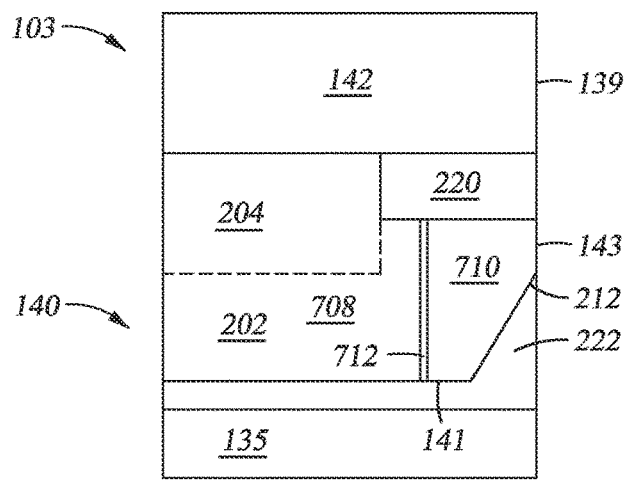
Figure 7C:
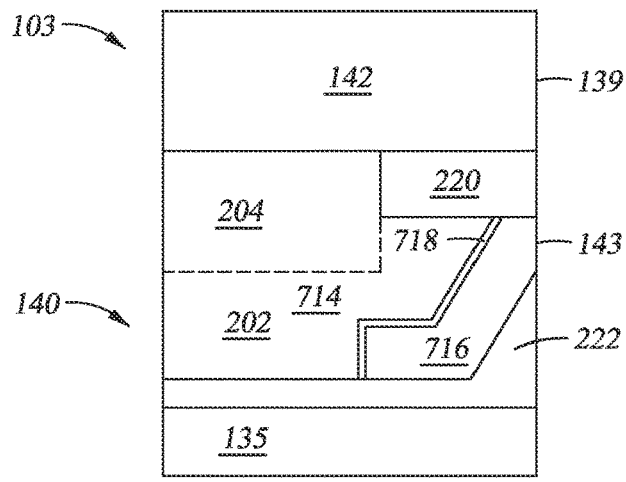

FIGS. 7A-7C are fragmented cross sectional side views of the HAMR write head 103 according to various embodiments. The second portion of the antenna 202 shown in FIGS. 5A-5C may be incorporated in the antenna 202 shown in FIGS. 2A/2B, 3A/3B and 4A/4B. As shown in FIG. 7A, the antenna 202 may include a first portion 702, a second portion 704 and a third portion 706. The first portion 702 may be the first portion 203 shown in FIG. 2B, the second portion 704 may be the second portion 209 shown in FIG. 2B, and the third portion 706 may be the second portion 504 shown in FIG. 5A. The first portion 702 may be made of a metal, such as Au, Ag or Al. The second portion 704 may be made of an alloy, such as the alloy for the second portion 209. The third portion 706 may be made of an element, such as Rh, Co, Ni, Pt, Pd, Ru, B, Mo, W, Ti, Ir or Re. The second portion 704 may be disposed between the third portion 706 and the spacer layer 220. The third portion 706 may be disposed between the first portion 702 and the second portion 704.

As shown in FIG. 7B the antenna 202 may include a first portion 708, a second portion 710 and a third portion 712. The first portion 708 may be the first portion 402 shown in FIG. 4B, the second portion 710 may be the second portion 404 shown in FIG. 4B, and the third portion 712 may be the second portion 508 shown in FIG. 5B. The first portion 708 may be made of a metal, such as Au, Ag, Cu or Al. The second portion 710 may be made of an alloy, such as the alloy for the second portion 209. The third portion 712 may be made of an element, such as Rh, Co, Ni, Pt, Pd, Ru, B, Mo, W, Ti, Ir or Re. The second portion 710 may be disposed between the third portion 712 and the MFS 139. The third portion 712 may be disposed between the first portion 708 and the second portion 710.

As shown in FIG. 7C, the antenna 202 may include a first portion 714, a second portion 716 and a third portion 718. The first portion 714 may be the first portion 302 shown in FIG. 3B, the second portion 716 may be the second portion 304 shown in FIG. 3B, and the third portion 718 may be the second portion 512 shown in FIG. 5C. The first portion 714 may be made of a metal, such as Au, Ag or Al. The second portion 716 may be made of an alloy, such as the alloy for the second portion 209. The third portion 718 may be made of an element, such as Rh, Co, Ni, Pt, Pd, Ru, B, Mo, W, Ti, Ir or Re. The second portion 716 may be disposed between the third portion 718 and the MFS 139 and between the third portion 718 and a portion of the cladding material 222. The third portion 718 may be disposed between the first portion 714 and the second portion 716.

Figure 8A:
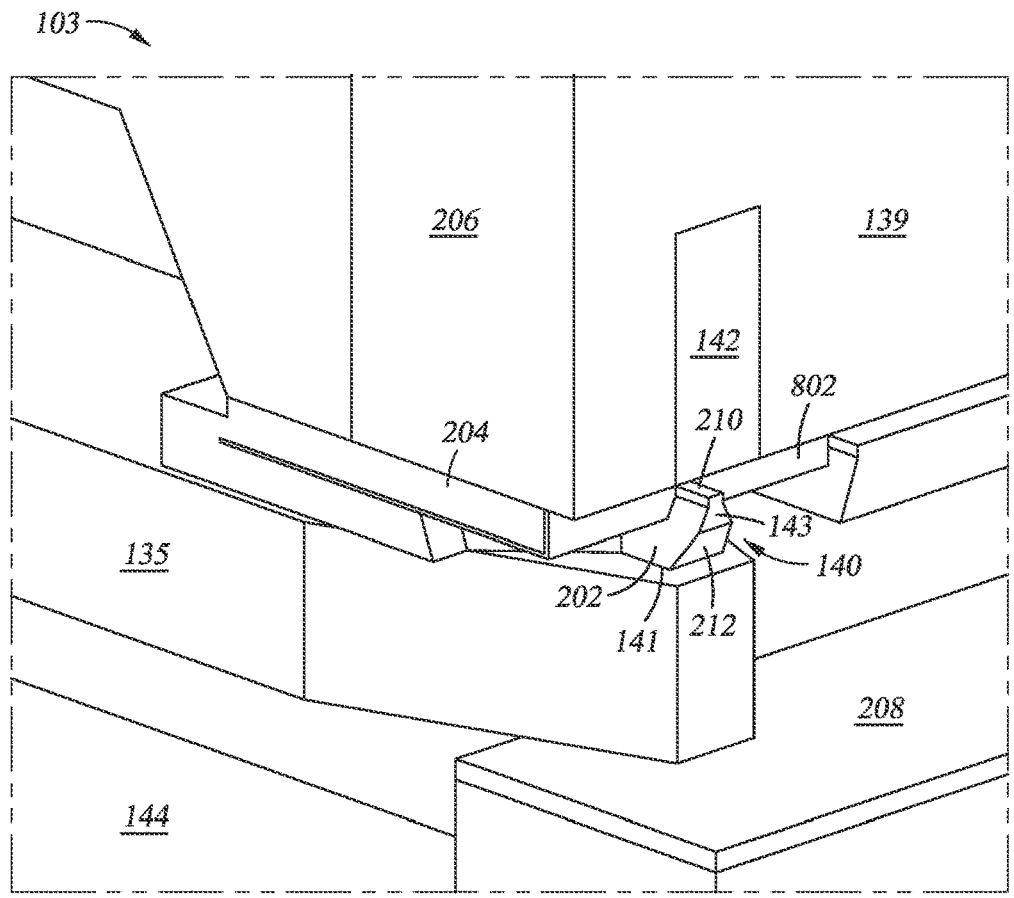
FIGS. 8A-8C illustrate the HAMR write head according to various embodiments described herein.
Figure 8B:
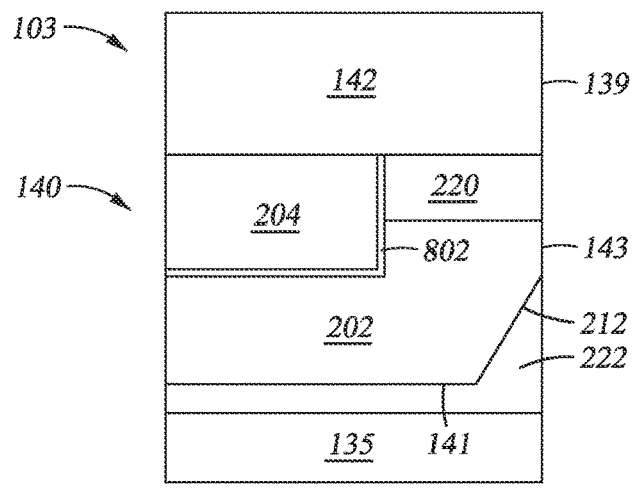
Figure 8C:
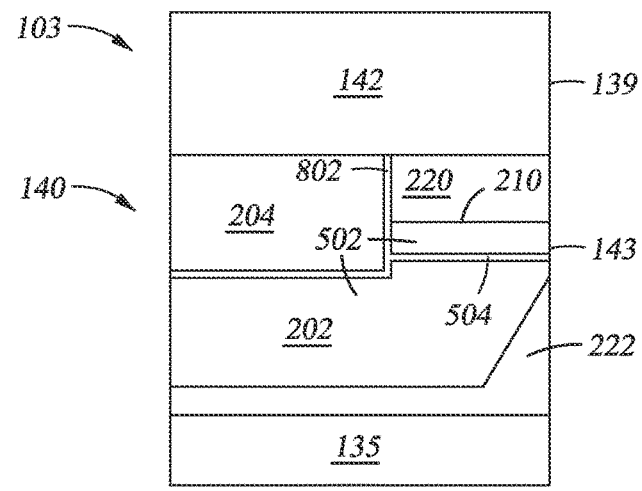

FIGS. 8A-8C illustrate the HAMR write head 103 according to various embodiments described herein. FIG. 8A is a fragmented perspective view of the HAMR write head 103, according to one embodiment described herein. The write head 103 may include a layer 802 disposed between the antenna 202 and the thermal shunt 204. As shown in FIG. 8B, the layer 802 may be between the spacer layer 220 and the thermal shunt 204 and between the antenna 202 and the thermal shunt 204. The layer 802 may be made of a material that has a higher melting point than the material of the antenna 202 in order to prevent the diffusion of the metallic atoms from the antenna 202 into the thermal shunt 204. The layer 802 may be made of the same material as the second portion 209 (FIG. 2A). The layer 802 may be used in combination with the antenna 202 that includes two or three portions as described above. FIG. 8C illustrates the layer 802 used with the antenna 202 as shown in FIG. 5A.

Figure 9A:
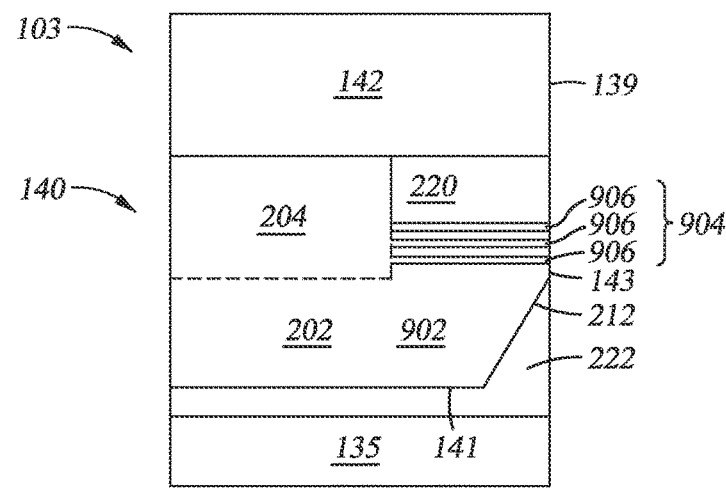
FIGS. 9A and 9B are fragmented cross sectional side views of the HAMR write head according to various embodiments.
Figure 9B:
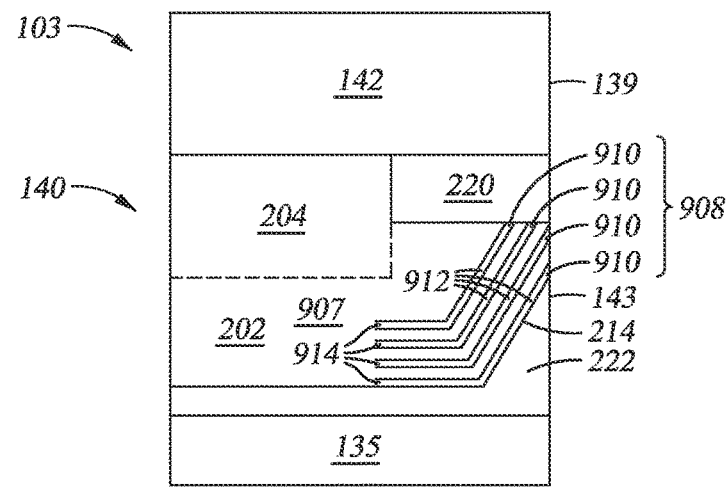

FIGS. 9A and 9B are fragmented cross sectional side views of the HAMR write head 103 according to various embodiments. As shown in FIG. 9A, the antenna 202 includes a first portion 902 and a second portion 904. The second portion 904 may include a plurality of layers 906 that is made of a material that is immiscible in the first portion 902 and has a higher melting point than the material of the first portion 902. The first portion 902 may be made of the same material as the first portion 203 (FIG. 2A) and the second portion 904 may be made of the same material as the second portion 209 (FIG. 2A). The plurality of layers 906 are spaced apart from one another, and the space between adjacent layers 906 is smaller than the thickness of each layer 906. Thus, the layer of the first portion 902 disposed in the space between adjacent layers 906 has a small thickness, so the grain growth of the layer of the first portion 902 between the adjacent layers 906 is reduced, which in turn prevents the deformation of the NFT 140. Each layer 906 may have a thickness ranging from about 1 nm to about 30 nm. In one embodiment, the layer 906 is made of an element, such as Rh, Co, Ni, Pt, Pd, Ru, B, Mo, W, Ti, Ir or Re, and has a thickness between about 1 nm and about 5 nm. In another embodiment, the layer 906 is made of an alloy, such as the alloy of the second portion 209 (FIG. 2A), and has a thickness between about 1 nm and about 30 nm.

As shown in FIG. 9A, each layer 906 of the plurality of layers 906 may be substantially perpendicular to the MFS 139. Alternatively, as shown in FIG. 9B, the antenna includes a first portion 907 and a second portion 908. The second portion 908 may include a plurality of layers 910. The first portion 907 may be made of the same material as the first portion 202 (FIG. 2A) and the second portion 908 may be made of the same material as the second portion 209 (FIG. 2A). Each layer 910 of the plurality of layers 910 may include a first portion 912 and a second portion 914. The first portion 912 of the layer 910 may be substantially parallel to the surface 214, and the second portion 914 of the layer 910 may be substantially parallel to the surface 141. The thickness of the layer 910 may be the same as the thickness of the layer 906.

In summary, a HAMR head having a NFT including an antenna having a first portion and a second portion is disclosed. The second portion is made of a material having a higher melting point that the material of the first portion. The second portion may is located at or near the area having the highest temperature in order to reduce the temperature rise of the NFT. The reliability of the HAMR head is improved as a result of the reduced temperature rise of the NFT.

While the foregoing is directed to embodiments of the disclosure, other and further embodiments may be devised without departing from the basic scope thereof, and the scope thereof is determined by the claims that follow.

What is claimed is:

1. A heat assisted magnetic recording head, comprising:
   a main pole;
   a waveguide;
   a near-field transducer disposed between the main pole and the waveguide, wherein the near-field transducer comprises an antenna, wherein the antenna includes a first portion made of a first material and a second portion consists only of a second material, wherein the second portion is a layer embedded in the first portion, wherein the second material is selected from a group consisting only of B, Re, and alloys of Re; and
   a thermal shunt coupled to the antenna, wherein the first portion is in contact with the thermal shunt, wherein the thermal shunt comprises a conductive material.

2. The heat assisted magnetic recording head of claim 1, wherein the second material has a higher melting point than the first material and the second material is immiscible in the first material.

3. The heat assisted magnetic recording head of claim 1, wherein the first material is selected from a group consisting of Au, Ag, Cu and Al.

4. The heat assisted magnetic recording head of claim 1, wherein the second portion is substantially parallel to a media facing surface.

5. The heat assisted magnetic recording head of claim 1, wherein the second portion is substantially perpendicular to a media facing surface.

6. The heat assisted magnetic recording head of claim 1, wherein the antenna further includes a first surface facing the main pole, a second surface at a media facing surface, a third surface facing the waveguide, and a fourth surface connecting the second surface and the third surface, and wherein the second portion comprises a first portion substantially parallel to the fourth surface, a second portion substantially parallel to the third surface, and a third portion substantially parallel to the media facing surface.

7. A heat assisted magnetic recording head, comprising:
a main pole;
a waveguide;
a near-field transducer disposed between the main pole and the waveguide, wherein the near-field transducer comprises an antenna, wherein the antenna includes:
a first portion made of a first material,
a second portion consists only of a second material, wherein the second portion is a layer embedded in the first portion, wherein the second material is selected from a group consisting only of Pt, Pd, B, and Re, and alloys of Pt, Pd and Re, and
a third portion made of a third material, wherein the third material has a higher melting point than the first material, and wherein the third material is distinct from the second material;
a thermal shunt coupled to the antenna, wherein the first portion is in contact with the thermal shunt, wherein the thermal shunt comprises a conductive material; and
a spacer layer disposed between the antenna and the main pole, wherein the third portion is disposed between the second portion and the spacer layer.

8. The heat assisted magnetic recording head of claim 7, further comprising a cladding material disposed between the antenna and the waveguide, wherein the third portion is disposed between the second portion and a media facing surface and between the second portion and the cladding material.

9. A heat assisted magnetic recording head, comprising:
a main pole;
a waveguide;
a heat sink;
a near-field transducer disposed between the main pole and the waveguide, wherein the near-field transducer comprises an antenna, wherein the antenna includes a first portion made of a first material and a second portion consisting only of a second material, wherein the second material has a higher melting point than the first material, wherein the antenna additionally includes a first surface at a media facing surface, and wherein the second portion includes at least a portion of the first surface, wherein the second material is selected from a group consisting only of B, Re, and alloys of Re; and
a thermal shunt disposed between the antenna and the heat sink, wherein the first portion is in contact with the thermal shunt, wherein the thermal shunt comprises a conductive material.

10. The heat assisted magnetic recording head of claim 9, wherein the second portion is substantially perpendicular to the first surface.

11. The heat assisted magnetic recording head of claim 9, wherein the antenna further includes a second surface facing the main pole, a third surface facing the waveguide, and a fourth surface connecting the third surface and the first surface, and wherein the second portion of the antenna includes the first surface, the fourth surface, a portion of the second surface and a portion of the third surface.

12. The heat assisted magnetic recording head of claim 11, wherein the second portion has a uniform thickness.

13. A heat assisted magnetic recording head, comprising:
a main pole;
a waveguide;
a near-field transducer disposed between the main pole and the waveguide, wherein the near-field transducer comprises an antenna, wherein the antenna includes a first portion made of a first material and a second portion consisting only of a second material;
a spacer layer disposed between the near-field transducer and the main pole;
a thermal shunt coupled to the antenna, wherein the thermal shunt comprises a conductive material; and
a metal layer disposed between the thermal shunt and the antenna, wherein the layer is also disposed between the thermal shunt and the spacer layer.

14. A hard disk drive, comprising:
a magnetic media;
a magnetic read head; and
a heat assisted magnetic recording magnetic write head, wherein the heat assisted magnetic recording magnetic write head comprises:
a main pole;
a waveguide;
a heat sink;
a near-field transducer disposed between the main pole and the waveguide, wherein the near-field transducer comprises an antenna, wherein the antenna includes a first portion made of a first material and a second portion consisting only of a second material, wherein the second material has a higher melting point than the first material, wherein the antenna additionally includes a first surface at a media facing surface, and wherein the second portion includes at least a portion of the first surface, wherein the second material is selected from a group consisting only of B, Re, and alloys of Re; and
a thermal shunt disposed between the antenna and the heat sink, wherein the first portion is in contact with the thermal shunt, wherein the thermal shunt comprises a conductive material.

15. The hard disk drive of claim 14, wherein the first material is selected from a group consisting of Au, Ag, Cu and Al.

16. The heat assisted magnetic recording head of claim 13, wherein the metal layer comprises a metal element or a metal alloy.

17. The heat assisted magnetic recording head of claim 13, wherein the metal layer consists of a metal element selected from the group consisting of Rh, Co, Ni, Pt, Pd, Ru, B, Mo, W, Ti, Ir, and Re.

18. The heat assisted magnetic recording head of claim 13, wherein the metal layer consists of a metal alloy selected from the group consisting of Rh, Co, Ni, Pt, Pd, Ru, B, Mo, W, Ti, Ir, Re, Au, Ag, Cu, and Al alloys.

19. A heat assisted magnetic recording head, comprising:
a main pole;
a waveguide;
a near-field transducer disposed between the main pole and the waveguide, wherein the near-field transducer comprises an antenna, wherein the antenna includes a first portion made of a first material, a second portion made of a second material, and a third portion made of a third material, wherein the third material has a higher melting point than the first material, and wherein the third material is distinct from the second material;

a thermal shunt coupled to the antenna, wherein the first portion is in contact with the thermal shunt, wherein the thermal shunt comprises a conductive material; and a spacer layer disposed between the antenna and the main pole, wherein the third portion is disposed between the first portion and the second portion.

20. The heat assisted magnetic recording head of claim 19, wherein the third portion is substantially parallel to a media facing surface.

21. The heat assisted magnetic recording head of claim 19, wherein the third portion is substantially perpendicular to a media facing surface.

22. The heat assisted magnetic recording head of claim 19, wherein the antenna further includes a first surface facing the main pole, a second surface at a media facing surface, a third surface facing the waveguide, and a fourth surface connecting the second surface and the third surface, and wherein the third portion comprises a first portion substantially parallel to the fourth surface, a second portion substantially parallel to the third surface, and a third portion substantially parallel to the media facing surface.

* * * * *